Patented Feb. 20, 1940

2,191,351

UNITED STATES PATENT OFFICE 2,191,351

COMBINATIONS OF A SOURCE OF RADIATION WITH MATERIAL ADAPTED TO BE EXCITED TO LUMINESCENCE BY THE RADIATION

Alfred Hamilton McKeag, Kenton, and John Turton Randall, Northfield, Birmingham, England, assignors to General Electric Company, a corporation of New York No Drawing. Application April 13, 1938, Serial No. 201,810. In Great Britain April 16, 1937

2 Claims. (Cl. 250—81)

This invention relates to luminescent materials, to methods of manufacturing them, and to means for producing light (more especially electric discharge lamps and cathode ray tubes) of which they form a part.

The primary object of the invention is to provide a luminescent material suitable for supplementing the light from mercury-vapour electric-discharge devices, so as to produce a lamp which either is more efficient as a source of light than the device alone or emits a resultant radiation substantially different in colour from that of the device alone or both. When the second object is in view, it is usually desirable that the colour of the luminescent light should be "warm", that is to say, should depart from white in the direction of yellow or red and not in the direction of green or blue. But, as is well known, a material suitable for attaining this primary object may be suitable for other purposes; it is within the invention to use the material about to be described for any purpose for which it may prove suitable in virtue of its luminescence.

Luminescent materials are usually specified in a manner based on the work of Lenard and his school. They concluded that the essential components of a "phosphor" were a main component and an activator. The main component (or matrix) might be a chemical compound, such as ZnS, of definite stoichiometric composition; it might also be a solid solution of two such compounds, such as (Zn—Cd)S. The activator was an impurity, such as copper or silver or bismuth, embedded in the matrix, but, since there was no evidence of a stoichiometric ratio, not chemically combined with it. The quantity and colour of the luminescent light usually varied with the amount of the activator and with the heat treatment used in embedding it. But, since the range of colour with a given matrix and activator was not very large (it never, for example, extended from red to blue), all "phosphors" having the same matrix and the same activator, if luminescent at all, were regarded by Lenard, and have been regarded in the arts using luminescent materials, as the same luminescent material, although they might not have all the same luminescent properties.

Specification by matrix, defined by a chemical formula, and activator has been found applicable to many luminescent materials other than those studied by Lenard, for example the silicates. But it has been already suspected that the distinction betwen matrix and activator cannot always be made with certainty. In the material about to be described the distinction is uncertain. The question therefore arises what alternative method of specification is possible which will neither include as the same material those that ought to be separated nor separate those that ought to be identified. It is necessary to find some method of specification which, while leading to the same identifications and separations as the matrix-activator specification among those materials to which that specification is applicable, is also applicable to those materials in which the distinction between matrix and activator is not clear.

It appears that this problem can be solved by specifying (1) the chemical elements essential to the material, whether they belong to matrix or activator, (2) the crystal structure of the material as indicated by X-ray analysis, (3) the luminescent properties. It is not certain that under (3) it is necessary to state more than that the material is usefully luminescent under some excitation. No example is actually known in which all luminescent materials, identical in respect of (1) and (2), do not resemble each other so closely in luminescent properties that, on the older classification, they would not be regarded as the same material. Indeed, if only one activator is known (2) alone would suffice. But it does not seem desirable to omit (3) entirely. The specification in respect of (3) should not be strict; for, if it were, materials now identified by common consent would be separated. No more should be specified than is necessary to ensure that all luminescent materials within the specification, and therefore regarded as the same material, should all have some utility in respect of some common purpose.

The method of specification just described will be adopted in this document. It must be understood that a material does not cease to be that specified merely by being mixed with some other material, luminescent or nonluminescent, so long as the material retains in the mixture its characteristic crystal structure and luminescent properties. Again when a colour is specified for the luminescent light under a given excitation, it is not implied that the material cannot be excited otherwise or that, when it is excited otherwise, the colour of the luminescent light, is the same.

According to the invention a luminescent material (1) contains as essential elements cadmium and manganese and chlorine and phosphorus and oxygen, (2) has a crystal structure in which the unit cell is hexagonal with axes substantially $a_0 = 9.7$ A. U. and $c_0 = 6.4$ A. U., and (3) emits under excitation by radiation of wave-length 2536

A. U. luminescent light whose colour is warm, as hereinbefore defined

The discovery on which the invention rests is that such a luminescent material exists.

It is desirable to state the evidence on which the foregoing specification of the crystal structure is based. Table I below gives, in conventional manner, the direct results of an X-ray analysis of a sample of material prepared in the manner described hereinafter. Column 1 gives the quantity usually denoted by $d/n$ for all lines observed, except a few so close to each other and/or so weak that they are difficult to measure; $d/n$ is the spacing in A. U. between the atomic planes generating the observed lines on the assumption that all reflections are of the first order; column 2 gives the intensities of the lines estimated visually. Column 3 gives the crystallographic indices of planes which would give the spacings in column 1 if the lattice were hexagonal with $a_0=9.67$ and $c_0=6.45$; a numeral in brackets indicates, as usual, the order of reflection. Within the range over which there are entries in column 3, all possible spacings characteristic of this lattice are present, except those corresponding to planes 00.1 and 10.1. These should give spacings between the first and second row of the table. Their absence is doubtless due to the fortuitous equivalence of different planes, such as is known to produce partial degeneracy of an X-ray pattern. In the range for which no entries are given in column 3, there are several (often many) alternative origins of the same spacing; it does not appear that any measured line is inconsistent with its arising from the said lattice.

*Table I*

| (1) $d/n$ | (2) Intensity | (3) Planar indices |
|---|---|---|
| 8.43 | 1 | 10.0 |
| 4.85 | 1 | 11.0 |
| 4.19 | 3 | 10.0(2) |
| 3.87 | 3 | 11.1 |
| 3.52 | 1 | 20.1 |
| 3.23 | 1 | 00.1(2) |
| 3.16 | 2 | 12.0 |
| 3.01 | 3 | 10.2 |
| 2.842 | 6 | 12.1 |
| 2.790 | 6 | 10.0(3) |
| 2.681 | 6 | 11.2 |
| 2.560 | 2 | { 10.1(2) / 30.1 } |
| 1.966 | 2 | ------ |
| 1.932 | 4 | ------ |
| 1.886 | 5 | ------ |
| 1.840 | 4 | ------ |
| 1.821 | 3 | ------ |
| 1.780 | 4 | ------ |
| 1.754 | 4 | ------ |
| 1.614 | 3 | ------ |
| 1.503 | 1 | ------ |
| 1.486 | 1 | ------ |
| 1.462 | 2 | ------ |
| 1.435 | 2 | ------ |
| 1.396 | 2 | ------ |
| 1.264 | 2 | ------ |

Lines of appreciable strength other than those recorded have occasionally been found associated with the recorded lines. They have always been identified as lines appropriate to one of the starting materials from which the specimen was prepared, and especially to cadmium phosphate. Those skilled in the art will recognise that lines that can be attributed to an impurity likely to be present should always be excluded from any list intended to identify a lattice.

If Table I is compared with the columns II of the table given in British provisional specification No. 10,922/37, it will be seen that there is only one difference that cannot be attributed to experimental error or to a failure to record weak lines. This is the absence from the said specification of the spacing 2.681 A. U. It is not possible now to examine the cause of this discrepancy; for the specimen from which the previous table was derived is no longer available.

Measurements on other samples of the material have always given spacings differing from those of Table I (if at all) by amounts scarcely exceeding the experimental error. But analogy with other luminescent materials suggests that it may be possible to form solid solutions having the same crystal form and substantially the same luminescent properties, but differing slightly in the values of $a_0$ and $c_0$. Accordingly in specifying the material, the second decimal place has been omitted and the qualification "substantially" added to indicate this possibility.

For a further understanding of the invention, a brief explanation will be given of the manner in which the crystal structure is derived from the data given in Table I. It will perhaps simplify the explanation to state that the figures in column 1 of the table are obtained from a film containing a number of X-ray spectrographic lines, each line representing the diffraction from a plane within the crystal. The planes which are most widely spaced produce diffraction lines close to the focal point and the planes that are spaced more closely together produce lines progressively farther out from the focus, the focus being the point where the X-ray beam strikes direct, namely, the place where the beam is not diffracted at all.

The above holds true for the so-called first order diffraction, and second and third order diffractions give spacings respectively one-half and one-third that of the first order spacing. Measurement is made on the film, usually in millimeters, from the zero point, or focus, out to each line and then the actual crystallographic spacing is obtained by using the well known formula $n\lambda=2d \sin\theta$, referred to, for example, on page 54 of The Science of Metals, by Jeffries and Archer, published in 1924 by the McGraw-Hill Book Co., Inc. By applying this formula, the actual distances between planes is calculated in Angstrom units. Column 1, therefore, gives the actual spacings in Angstrom units. Column 2 gives the intensities of the lines, the weakest ones being designated as 1, and the strongest ones being about six times that of the weakest. From experience, it will be obvious to the expert from the actual inter-planar distances that the crystal system is probably hexagonal. This is suggested by the difference between the first and second lines and also because the third line is half that of the first, indicating a second order diffraction, and that the tenth line (2.790) is approximately one-third that of the first, which suggests a third order diffraction. If this is the case, the value $a_0$ of a side of the basic hexagon would be equal to the inter-planar distance in the first column divided by the tangent of 60° and multiplied by 2. Inasmuch as the measurement of the lines farther from the focus is somewhat more accurate than those closer in, it is customary to use the former for the more accurate determination of the dimensions of the unit cell. Using the first inter-planar distance, 8.43, as a basis, the dimensions of a side of the unit hexagon would be 8.43, divided by tangent 60° and multiplied by 2, which equals 9.72 which should be the approximate value for $a_0$. Another check on this is that the second line, 4.85, should be one-half $a_0$; and multiplying this by 2 gives a value of 9.7. If we check the third order diffraction, namely 2.79, and multiply by 3, we get the value 8.37, which is probably somewhat more accurate than the first figure 8.43. By carrying this calculation through, we arrive at a figure of approximately 9.67 for the value of $a_0$.

To find the value of $c_0$, which designates, as usual, the height of the hexagon, the first approximation would be to multiply the sixth line (3.23) by 2, which is 6.46. It seems probable that the twentieth line, namely, 1.614, should be just half of the sixth line, 3.23. Multiplying 1.614 by 4 gives 6.456 for the value of $c_0$. It is apparent to an expert, therefore, that the data given in Table I is consistent with the hexagonal crystal structure with the dimensions $a_0$ equal to approximately 9.7, and the $c_0$ value to approximately 6.4.

We now proceed to methods of preparing the material, and therefore to the evidence for the component elements.

In every method by which we have actually prepared the material, a mixture is heated of which the components are a cadmium salt, a manganese (actually manganous) salt, a chloride and an orthophosphate. (There are not always four components; the cadmium salt or the manganese salt may be a chloride or an orthophosphate). The proportion of manganese may be varied within wide limits without changing the crystal structure (it is possible that additional spacings characteristic of some other lattice may sometimes appear) or modifying substantially the luminescent properties. Further the base of the manganese salt is not critical; the salt may be a chloride or phosphate, but it may also be, for example, a nitrate. It has not been found possible to prepare the material if metaphosphate is substituted for orthophosphate; but our experiments in this direction are not exhaustive; in particular the presence of deleterious impurities was not wholly excluded. In both the preferred methods given below cadmium phosphate, obtained by precipating a soluble cadmium salt with di-ammonium hydrogen orthophosphate, is one component of the mixture; but it need not be a component; the material has been prepared by heating together cadmium oxide, orthophosphoric acid (or phosphorus pentoxide), cadmium chloride and manganous phosphate. On the other hand no success could be obtained with one sample of cadmium phosphate, bought as pure; the products obtained with this material were highly coloured, and displayed no luminescence whatever; the material according to the invention is normally almost colourless.

These facts suggest at first sight that the material according to the invention consists essentially of a matrix of cadmium chlor-phosphate, of the composition generally written as $$3Cd_3(PO_4)_2.CdCl_2$$

containing manganese as an activator. The failure to obtain the material with the said sample of cadmium phosphate may be due to a physical state of the sample which does not allow the manganese to enter the lattice; on the other hand it may be due to the presence of some deleterious impurity. Some confirmatory evidence is provided by the statement of R. W. G. Wyckoff in his book, The Structure of Crystals, (second edition) page 300 that lead chloro-phosphate, $3Pb_3(PO_4)_2.PbCl_2$, has a similar crystal lattice, namely hexagonal with

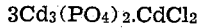

$$a_0 = 10.03 \text{ A. U.}, \quad c_0 = 7.38 \text{ A. U.}$$

(Wyckoff does not mention a cadmium chloro-phosphate).

On the other hand, it does not appear necessary that the chlorine content of the material should be that indicated by the said suggested formula (namely 4.02% Cl). Good results have been attained when the amount of chlorine originally added is considerably less than this. Thus, in the first method of preparation described hereinafter, the proportion added is only 2.8%; and even when, as in the second method described hereinafter, the chlorine added exceeds 4.02%, less than this amount is usually found in the material after water-soluble (and therefore presumably unchanged) chloride has been removed from it. Again, if the manganese is a mere activator, the permissible variation in the activator is much wider than usual; materials of substantially the same luminescent properties have been prepared containing as little as 1% or as much as 20% of manganese elements; it is not certain that even these wide limits may not be exceeded. A weak luminescence has been found with as little as 0.01% manganese; but it is possible that the material should then be regarded as a mixture of luminescent and inert material. The possibility that part of the manganese may replace cadmium isomorphously in the lattice cannot be ignored; but this would not by itself explain the deficiency in chlorine, even when X-ray analysis shows little or no excess of cadmium phosphate. A more probable explanation is that a solid solution of the chlor-phosphate with excess cadmium phosphate is found, whose lattice differs little from that of the chlor-phosphate.

However, these considerations are relevant to the invention only if new methods of preparing the material are sought. We have made extensive experiments, and have found no better method of preparation than the simple ones about to be described; but analogy with other luminescent materials suggests that manufacture will be improved continually as experience is gained, or by definite modifications of the methods.

Two alternative methods will be described in detail; the second of them appears to be slightly preferable, and to give on the average rather higher efficiencies. The reagents other than cadmium chloride used as the starting materials in these methods are all of the kind known under the trade name "AnalaR" grade. Cadmium chloride is not available in this grade; ordinary commercial material was used. Both methods contain a common step. In this step 480 gm. of cadmium sulphate is dissolved in 1500 ml. of boiling distilled water, and 160 gm. of di-ammonium hydrogen orthophosphate is dissolved in 1000 ml. of boiling distilled water. 10 ml. of the second solution is added to the whole of the first; the precipitate formed is filtered off and discarded. The remainder of the second solution is added to the filtrate; the precipitate is filtered off, washed well with hot distilled water, and dried at 180° C. for three hours. This precipitate, which is some kind of cadmium phosphate, is called precipitate A.

In the first method there is added to precipitate A 5% of its weight of manganese element in the form of a solution of manganous chloride in distilled water. A paste in which the precipitate and the solution are intimately mixed is formed; it is dried at 180° C. The product is ground and heated in air, in a tubular boat with one end closed by a glass wool plug, at 925° C. for half an hour. The resulting material is washed by decantation with hot distilled water six times, and dried at 180° C. for 2 hours.

In the second method, 370 gms. manganous sulphate are dissolved in 1500 ml. of boiling distilled water and 160 gm. di-ammonium hydrogen phosphate in 1000 ml. of boiling distilled water. The solutions are mixed and the precipitate formed is washed and dried at 180° C.; it is then precipitate B.

Precipitates A and B are mixed with solid cadmium chloride in the ratio of 100 parts by weight of A to 20 parts of cadmium chloride to 5 parts of B. The substances are ground and thoroughly mixed together, the mixture is heated in a tubular boat, as before, to 800° C. for half an hour. The resulting material is washed and dried as in the first method.

The material produced by either of those methods emits luminescent light, of a colour ranging from orange-yellow to pink, with a useful efficiency under excitation by any radiation with a wave-length within the range 2200–2600 A. U.; the efficiency of luminescence under radiation of wave-length as long as 3650 A. U. is considerably less, but appears to increase with the content of manganese. Excitation by radiation of wave-length less than 2200 A. U. has not been examined fully owing to experimental difficulties; but it does not appear that the material is likely to be usefully associated with the neon discharge in the manner described in British patent specification No. 457,486, if only because the colour of the luminescent light is not very different from that of the light from neon. When bombarded by electrons having an energy of some 3000 electron-volts, the material emits luminescent light of a colour rather yellower than that emitted under excitation by 2536 A. U. Thus the material may be used for the fluorescent screens of cathode-ray tubes, but, if a less highly coloured light is required (as is usual), it must be mixed in known manner with some material emitting greener or bluer light, for example willemite.

The most important use for the material discovered so far is that indicated by the primary object of the invention. If the material is distributed uniformly (except possibly at the ends) in a layer of suitable thickness on the interior surface of a low pressure mercury discharge lamp, and if the current density of the discharge is some 20 mA./cm.$^2$, an efficiency of 25 lumen/watt can be obtained for the light resulting from the combination of the light from the discharge with the light from the luminescent material, the colour of this resultant light being a pale pink.

But since the luminescent material is excited by that part of the mercury spectrum that is transmitted by quartz, it may also be usefully combined with a high-pressure mercury-vapour discharge lamp having a quartz envelope, to increase the red content of the total light. The material must then be placed outside the envelope. The term "mercury" does not imply the absence of substances, additional to mercury, which may contribute appreciably to the light from the lamp.

When excited by the mercury spectrum, or indeed by any other agent, luminescent material according to the invention may be associated in known manner with other luminescent materials, being (for example) mixed with it.

We claim:

1. A luminescent material which (1) contains as essential elements cadmium and manganese and chlorine and phosphorus and oxygen, (2) has a crystal structure in which the unit cell is hexagonal with axes substantially $a_0=9.7$ A. U. and $c_0=6.4$ A. U., and (3) emits under excitation by radiation of wave-length 2536 A. U. luminescent light whose colour is warm, as hereinbefore defined.

2. A luminescent material consisting of a cadmium chloro-phosphate with part of the cadmium replaced by manganese and corresponding substantially to the formula $(Cd, Mn)_5(PO_4)_3Cl$.

ALFRED HAMILTON McKEAG.
JOHN TURTON RANDALL.